United States Patent Office 2,774,777
Patented Dec. 18, 1956

2,774,777

17α-METHYL-19-NORTESTERONE

Carl Djerassi, Birmingham, Mich., and Luis Miramontes and George Rosenkranz, Mexico City, Mexico, assignors to Syntex S. A., Mexico City, Mexico, a corporation of Mexico No Drawing. Original application November 12, 1952, Serial No. 320,154, now Patent No. 2,744,122, dated May 1, 1956. Divided and this application April 10, 1956, Serial No. 582,900

4 Claims. (Cl. 260—397.4)

The present invention relates to cyclopentanophenanthrene derivatives and to a process for the preparation thereof.

More particularly the present invention relates to $\Delta^4$-19-nor-androsten-17β-ol-3-one compounds, having 17α-methyl or ethynil substituents and to a process for producing these compounds.

In United States application of Djerassi, Rosenkranz and Miramontes, Serial Number 250,036, filed October 5, 1951, there is disclosed a novel process for the production of 19-norprogesterone. As set forth in this application, 19-norprogesterone has been found to be even stronger in its progestational effect than progesterone itself.

In accordance with the present invention, it has been found that the method described in detail in the aforementioned application may be applied to produce compounds of the androsten series, namely, $\Delta^4$-19-norandrosten-3,17-dione. By protecting the 3-keto group of this compound, as by the formation of a suitable enol ether as hereinafter set forth in detail and reacting the resultant 3 enol ether with suitable reagents, there may then be produced $\Delta^4$-19-nor-17α-methylandrosten-17β-ol-3-one or $\Delta^4$-19-nor-17α-ethynilandrosten-17β-ol-3-one. The first of these compounds exhibits more pronounced androgenic effects than its homologue methyltestosterone and the second of these compounds exhibits more pronounced progestational effects than its homologue ethyniltestosterone.

Certain of the novel compounds of the present invention may therefore be represented by the following structural formula:

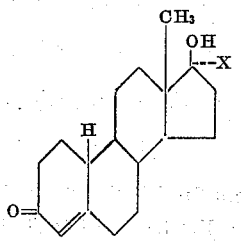

In the above formula X is selected from the group consisting of C≡CH and CH₃.

Compounds as exemplified by the foregoing formula may be produced in accordance with the process outlined by the following equation:

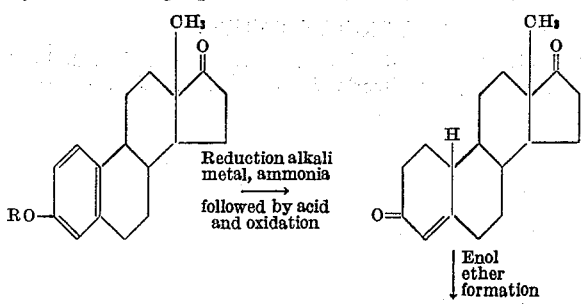

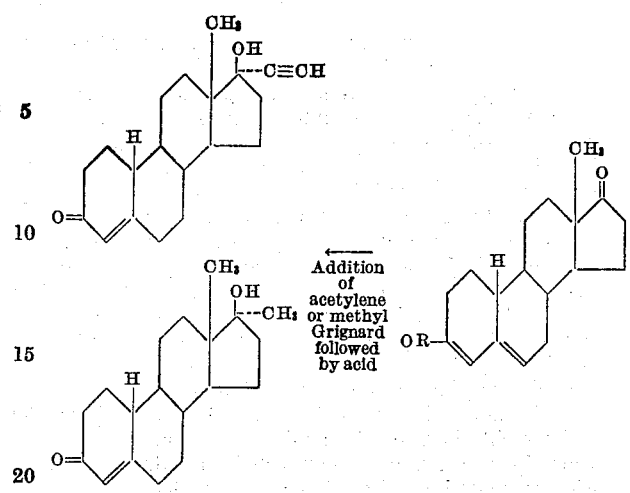

In the above equation R represents a lower alkyl radical, as for example methyl or ethyl, and R¹ represents a lower alkyl radical such as ethyl or methyl or a benzyl radical or any of the other groups which are customarily used as part of an enol ether customarily used for the production of the 3-keto group of steroids. Thus, in the alternative rather than an alkyl or benzyl enol ether as shown benzyl thioenolethers may be utilized in the present reaction or other thioenolethers.

In practicing the process of the present invention, a suitable 3 lower alkyl ether as for example 3-methoxyesterone is dissolved in a suitable solvent such as anhydrous dioxane. Thereafter anhydrous liquid ammonia and an alkali metal, such as lithium or sodium metal, are added to the mechanically stirred solution. The stirring is continued for a short period, as for example one hour, and a quantity of ethanol is then added. When the reaction is complete and the blue color produced disappears, water is then added. The ammonia is then evaporated on a steam bath and the product collected with 2 lt. of water. Extraction with a suitable solvent, such as ether, and ethyl acetate followed by evaporation to dryness under vacuum, produced a yellow oil. The oil thus obtained was then dissolved in a suitable solvent, such as methanol, and refluxed with a mineral acid, such as hydrochloric acid, for approximately one hour. After purification, extraction and so forth, the product obtained was a yellow oil having an ultraviolet absorption maximum characteristic of a $\Delta^4$-3-ketone. The last-mentioned yellow oil was then oxidized as by adding chromic acid in acetic acid to a stirred solution of the oil in acetic acid at a temperature below 20° C. Purification of the oxidation product produced $\Delta^4$-19-norandrosten-3,17-dione, which was a valuable intermediate for the further steps of the present process.

The 3-keto group of the $\Delta^4$-19-norandrosten-3,17-dione could be protected for further steps in the present process by forming a suitable enol ether thereof. For example, by treating the compound with ethyl orthoformate, the $\Delta^{3,5}$-19-nor-3-ethoxy-androstadien-17-one was formed. If the 3 enol ether thus formed is then treated with a suitable methyl Grignard reagent, such as methyl magnesium bromide in a suitable solvent, such as anhydrous ether, followed by acidification with a suitable mineral acid, such as hydrochloric acid, there is then produced novel $\Delta^4$-19-nor-17α-methyl-androsten-17β-ol-3-one. If, on the other hand, the 3 enol ether is treated with acetylene in the presence of an alkali metal alkoxide, such as potassium tertiary amyloxide, there is formed $\Delta^4$-19-nor-17α-ethanylandrosten-17β-ol-3-one.

The following specific examples serve to illustrate but are not intended to limit the present invention:

Example I 7.5 g. of 3-methoxyesterone were dissolved in 750 cc. of anhydrous dioxane in a three-neck flask, placed in a box and insulated with cotton wool. 2 lt. of anhydrous liquid ammonia and 15 g. of lithium metal in the form of wire were added to the mechanically stirred solution. After stirring for one hour, 150 cc. of absolute ethanol were added at such speed that no bumping occurred; when the blue color had disappeared, 500 cc. of water were added in the same way. The ammonia was evaporated on the steam bath and the product collected with 2 lt. of water. It was extracted with ether and then with ethyl acetate and the combined extract was washed to neutral and evaporated to dryness under vacuum, leaving 7.4 g. of a slightly yellow oil.

The oil thus obtained was dissolved in 400 cc. of methanol and refluxed during one hour with 150 cc. of 4-normal hydrochloric acid. The mixture was poured in a sodium chloride solution and extracted with ethyl acetate, washed to neutral, dried and evaporated to dryness. The product was a yellow oil which showed an ultraviolet absorption maximum at 240$\mu$ (log $\epsilon$ 4.31), characteristic of a $\Delta^4$-3-ketone.

A solution of 2.7 g. of chromic acid in 20 cc. of water and 50 cc. of acetic acid was added to the stirred solution of the above oil in 100 cc. of acetic acid, maintaining the temperature below 20° C. After 90 minutes standing, 50 cc. of methanol were added and the mixture concentrated under vacuum (20 mm.). The residue was extracted with ether, washed to neutral and evaporated to dryness. The residual semi-crystalline product (7 g.) was chromatographed over alumina and the fractions eluted with ether yielded 3.2 g. of $\Delta^4$-19-norandrosten-3,17-dione having a melting point of 163°–167° C.

Example II

Following the method described in Example I, but using 15 g. of sodium instead of lithium, exactly the same results were obtained.

Example III

A solution of 2 g. of $\Delta^4$-19-norandrosten-3,17-dione and 0.4 g. of pyridine hydrochloride in 50 cc. of benzene free of thiophene was made free of moisture by distilling a small portion 4 cc. of absolute alcohol and 4 cc. of ethyl orthoformate were added and the mixture was refluxed during 3 hours. 5 cc. of the mixture were then distilled and after adding an additional 4 cc. of ethyl orthoformate the refluxing was continued for two hours longer. The mixture was evaporated to dryness under vacuum and the residue was taken up in ether, washed, dried and evaporated to dryness. The residue was crystallized from hexane-acetone and then from ether to give $\Delta^{3,5}$-19-nor-3-ethoxy-androstadien-17-one with a melting point of 140°–142° C., [$\alpha$]$_D$—83.05°, ultraviolet absorption maximum at 242$\mu$ (log $\epsilon$ 4.4).

Example IV

A solution of 1 g. of $\Delta^{3,5}$-19-nor-3-ethoxy-androstadien-17-one in 10 cc. of anhydrous ether was added to a solution of 10 g. of methyl magnesium bromide in 25 cc. of anhydrous ether and the mixture was refluxed during two hours and then poured in water, acidified with 50% hydrochloric acid to pH 1 and left standing for one hour. The product was extracted with ether, washed to neutral, dried and evaporated to dryness. Several crystallizations from ether-hexane yielded $\Delta^4$-19-nor-17$\alpha$-methyl-androsten-17$\beta$-ol-3-one with a melting point of 154°–156° C., [$\alpha$]$_D$+30.3°, ultraviolet absorption maximum at 240$\mu$ (log $\epsilon$ 4.32).

Example V 1 g. of potassium metal was dissolved in 25 cc. of tertiary amyl alcohol by heating under an atmosphere of nitrogen. 1 g. of $\Delta^{3,5}$-19-nor-3-ethoxyandrostadien-17-one in 25 cc. of anhydrous toluene was added and nitrogen was passed during 15 minutes. Then acetylene (especially dried and purified) was passed during 14 hours through the mechanically stirred solution, at room temperature. The mixture was poured in water, acidified to pH 1, with dilute hydrochloric acid, heated on the steam bath for 30 minutes and then subjected to steam distillation to remove the organic solvents. The residue was filtered, dried and recrystallized several times from ethyl acetate. The $\Delta^4$-19-nor-17$\alpha$-ethynilandrosten-17$\beta$-ol-3-one thus obtained had a melting point of 198°–200° C. (in sulphuric acid bath), 200°–204° C. (Kofler), [$\alpha$]$_D$—31.73°, ultraviolet absorption maximum at 240$\mu$ (log $\epsilon$ 4.38).

This application is a division of United States application Serial No. 320,154, filed November 12, 1952, now Patent No. 2,744,122, granted May 1, 1956.

We claim:

1. A process for the proluction of a compound having the following formula:

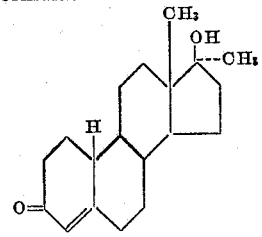

which comprises reducing a lower alkyl ether of estrone with an alkali metal in liquid ammonia followed by hydrolysis with a mineral acid and oxidation with chromic acid to form $\Delta^4$-19-norandrosten-3,17-dione, selectively forming a 3-enol ether of said dione and treating said ether with a methyl Grignard reagent, followed by hydrolysis with a mineral acid.

2. The process of claim 1 wherein the alkali metal is lithium.

3. The process of claim 1 wherein the alkali metal is sodium.

4. $\Delta^4$-19-nor-17$\alpha$-methylandrosten-17$\beta$-ol-3-one.

References Cited in the file of this patent

UNITED STATES PATENTS

| | | |
|---|---|---|
| 2,308,835 | Ruzicka | Jan. 19, 1943 |
| 2,374,369 | Miescher | Apr. 24, 1945 |
| 2,660,586 | Murray | Nov. 24, 1953 |
| 2,698,855 | Hicks | Jan. 4, 1955 |
| 2,721,871 | Colten | Oct. 25, 1955 |

FOREIGN PATENTS

| | | |
|---|---|---|
| 211,488 | Switzerland | Dec. 2, 1940 |
| 211,653 | Switzerland | Jan. 16, 1941 |